(12) United States Patent
Allen et al.

(10) Patent No.: US 7,861,001 B2
(45) Date of Patent: Dec. 28, 2010

(54) TRANSPORT INDEPENDENT REDIRECTION

(75) Inventors: Nicholas Alexander Allen, Redmond, WA (US); Jay C. Thaler, Kirkland, WA (US); Kenneth David Wolf, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 207 days.

(21) Appl. No.: 12/111,890

(22) Filed: Apr. 29, 2008

(65) Prior Publication Data

US 2009/0271495 A1 Oct. 29, 2009

(51) Int. Cl.
G06F 15/173 (2006.01)
G06F 15/16 (2006.01)
G06F 9/46 (2006.01)
(52) U.S. Cl. .................. 709/238; 709/203; 718/105
(58) Field of Classification Search ................. None
See application file for complete search history.

(56) References Cited

U.S. PATENT DOCUMENTS

| | | | | |
|---|---|---|---|---|
| 6,070,080 | A * | 5/2000 | Madour et al. | 455/458 |
| 6,389,462 | B1 | 5/2002 | Cohen et al. | |
| 7,080,158 | B1 | 7/2006 | Squire | |
| 7,180,912 | B1 * | 2/2007 | Samarasinghe | 370/474 |
| 2003/0088421 | A1 * | 5/2003 | Maes et al. | 704/270.1 |
| 2003/0093462 | A1 * | 5/2003 | Koskelainen et al. | 709/203 |
| 2005/0063377 | A1 | 3/2005 | Bryan et al. | |
| 2006/0020684 | A1 | 1/2006 | Mukherjee et al. | |
| 2006/0041431 | A1 * | 2/2006 | Maes | 704/270.1 |
| 2006/0187903 | A1 * | 8/2006 | Kallio et al. | 370/352 |
| 2007/0022199 | A1 | 1/2007 | Tatsubori | |
| 2007/0156721 | A1 | 7/2007 | Bollow | |
| 2007/0174288 | A1 * | 7/2007 | Stoyanova | 707/10 |
| 2007/0174491 | A1 | 7/2007 | Still et al. | |
| 2008/0282254 | A1 * | 11/2008 | Blander et al. | 718/105 |
| 2009/0019106 | A1 * | 1/2009 | Loupia | 709/203 |

FOREIGN PATENT DOCUMENTS

WO 2005060203 A1 6/2005

OTHER PUBLICATIONS

Fielding et al., RFC2616, Jun. 1999.*
Java Logging with J2EE and HTTP Request Forwarding, Redirecting, and Including (10 pages) http://java.sun.com/jsp_utils/PrintPage.jsp?url=http%3A%2F%2Fjava.sun.com%2Fdeveloper%2FEJTechTips%2F2003%2Ftt0513.html.
A Protocol Language Approach to Generating Client-Server Software ( 27 pages) http://66.102.1.104/scholar?hl=en&lr=&q=cache:bJgtaeMplyUJ:https://www.cs.fit.edu/Projects/tech_reports/cs-2000-2. pdf+http+request+redirection+with+request-reply+message+protocol.
Redirecting HTTP 301 Status Codes with ASP.NET and IIS ( 10 pages) http://www.wrox.com/WileyCDA/Section/id-306460.html.
Describe the role of the WS-I Basic Profile when designing J2EE Web services ( 8 pages) http://java.boot.by/wsd-guide/ch07s04.html.

* cited by examiner

*Primary Examiner*—Wen-Tai Lin
(74) *Attorney, Agent, or Firm*—Workman Nydegger

(57) ABSTRACT

Transport independent redirection. If a client computing system were to request a service from a service computing system, the service may determine whether or not the client should request the service from yet another service. If the client should request the service from the other computing system, the original service (or its intermediary) generates and transmits a transport-independent redirect message to the client. The client may then issue the request to the new service specified in the redirect response. The redirect message is not limited to a particular type of transport protocol. In addition, the redirect may be made possible in any number of message exchange patterns, not just request-response.

23 Claims, 6 Drawing Sheets

TRANSPORT INDEPENDENT REDIRECTION

BACKGROUND

Computer networks are a collection of computing systems that operate on the principle that one computing system representing one node in the network can communicate with another computing system representing another node in the network. One of the primary purposes for such communication is often information retrieval. For instance, one network node (i.e., a client) will issue a request for a resource from another network node (i.e., a server).

In HyperText Transport Protocol (HTTP), if a server does not have the requested resource or for some other reason cannot process the message, the server might determine if there are other network nodes that can process the message. In that case, the server might send an HTTP redirect response specifying instructions whereby the client might redirect its request elsewhere. The HTTP redirect response includes 1) information specifying that the response is a redirect, 2) a code indicating the type of the redirect, and 3) a destination identifier to which the client should redirect the request. This redirect may be done automatically without the user having to expend effort.

Additionally, redirection is frequently used to stitch together application services that have distributed control or have multiple, linked resources, such as as separate services for resource access control and resource data. Examples of these distributed services connected by redirects are typified by load balancers and directory-based routers.

From a user perspective, redirection is advantageous since redirection permits leniency regarding what addresses may be used to acquire a resource. If the browser knows an address that was once valid for the resource, and has been appropriate redirected to the updated address, the user will still be permitted access. Redirection is also beneficial from a service operations perspective, since it allows the service to use different addresses for a service with little or no ramifications for the user.

BRIEF SUMMARY

At least some embodiments described herein relate to the performance of a redirect in a transport independent manner. If a client computing system were to request a service from a service computing system, the service computing system may determine whether or not the client computing system should request the service from another service computing system. If the client computing system should request the service from the other computing system, the original service computing system (or its intermediary) generates and transmits a transport-independent redirect message to the client computing system. The client computing system may then issue the request to the new service computing system specified in the redirect response.

The redirect message is not limited to a particular type of transport protocol. In addition, the redirect may be made possible in any number of message exchange patterns, not just a simple request-response message pattern. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, transport independent redirection in described. If a client computing system were to request a service from a service computing system, the service may determine whether or not the client should request the service from yet another service. If the client should request the service from the other computing system, the original service (or its intermediary) generates and transmits a transport-independent redirect message to the client. The client may then issue the request to the new service specified in the redirect response. The redirect message is not limited to a particular type of transport protocol. In addition, the redirect may be made possible in any number of message exchange patterns, not just request-response.

First, some introductory discussion regarding a computing system will be described with respect to FIG. 1. Then, various embodiments of the redirection that is not dependent on a particular transport will be described with respect to FIGS. 2 through 6.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Figure 1:
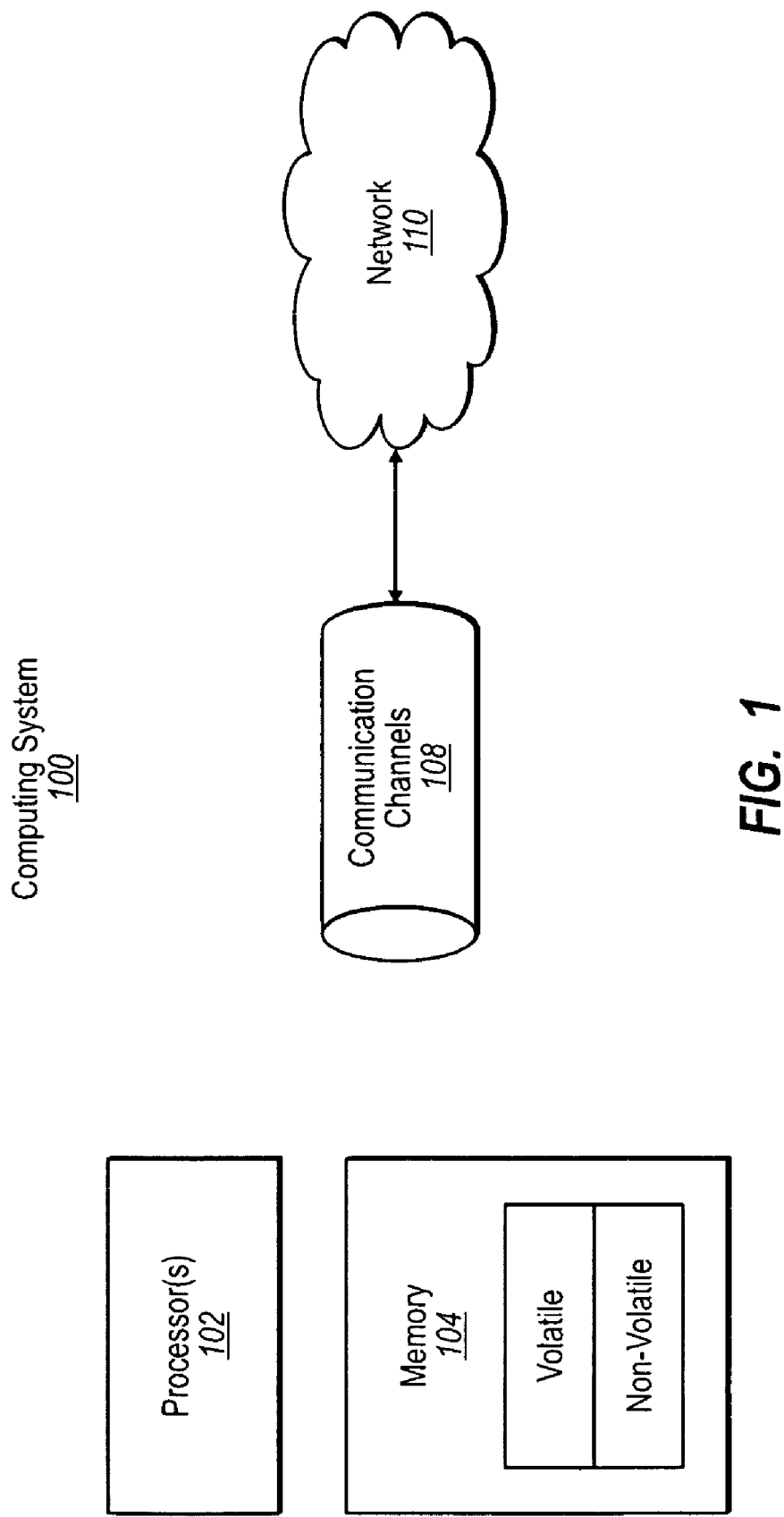
FIG. 1 illustrates an example computing system that may be used to employ embodiments described herein.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system TOO.

Computing system 100 may also contain communication channels 108 that allow the computing system 100 to communicate with other message processors over, for example, network 110. Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Figure 2:
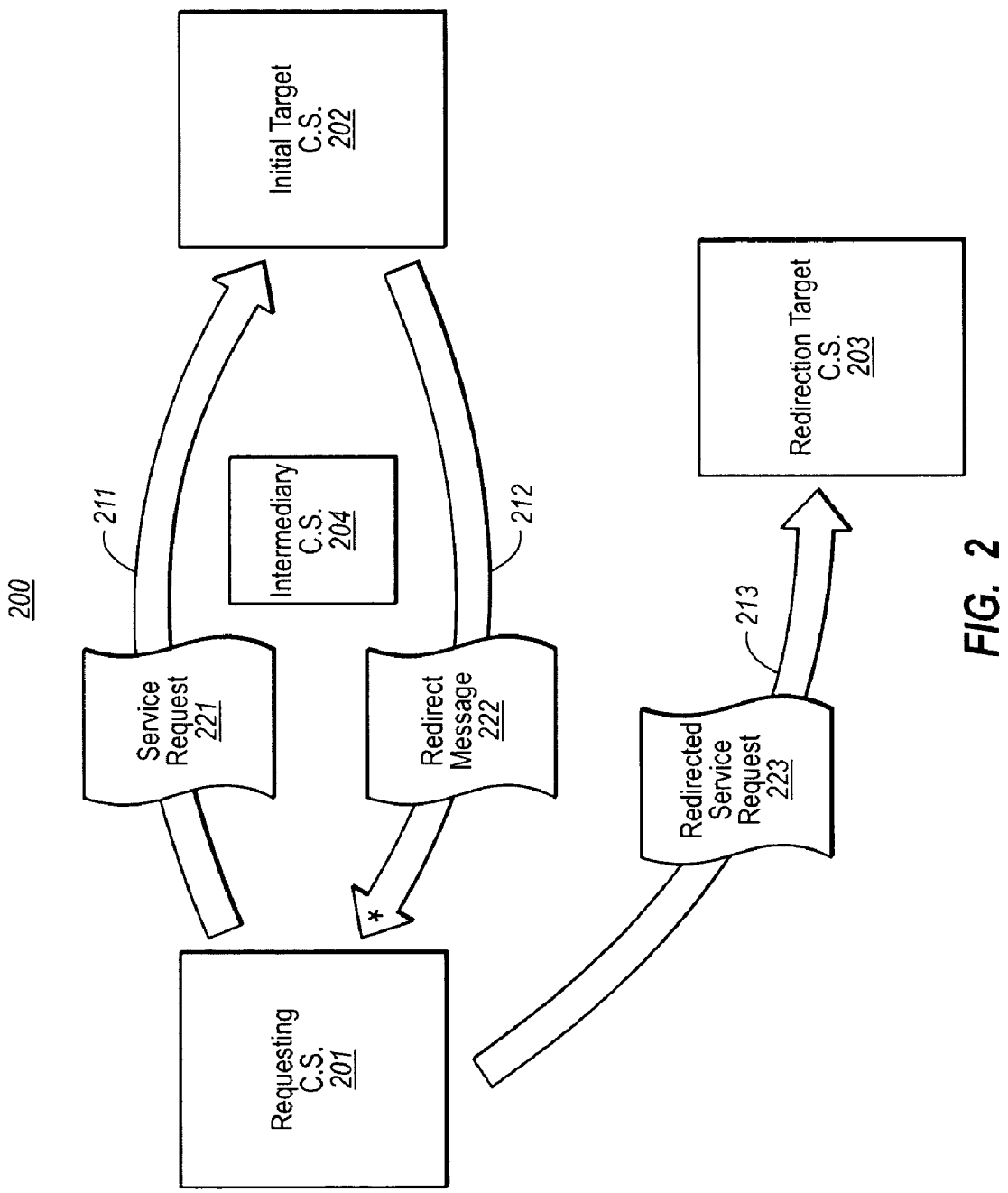
FIG. 2 illustrates an environment in which redirection is accomplished in a transport-independent manner.

FIG. 2 illustrates a network environment 200 in which the redirection described herein may occur. The network environment 200 includes a requesting computing system 201, an initial target computing system 202, and a redirection target computing system 203. The requesting computing system 201 directs a service request 221 to the initial target computing system 202 as represented by arrow 211. The initial target computing system 202 then dispatches a redirect message 222 to the requesting computing system 201 as represented by arrow 212. The requesting computing system 201 may then send a redirected service request 223 to the redirection target computing system 203 as represented by the arrow 213. The intermediary computing system 204 may be a redirection proxy that serves the initial target computing system, and may perform the redirection in lieu of the initial target computing system. Although not required, the various computing systems 201 through 204 may be structured as described above with respect to the computing system 100 of FIG. 1.

The arrow 212 is annotated with an asterisk "*" to emphasize the redirect message 222 may be structured such that it is dispatched using an overarching protocol that is not limited to any one specific underlying transport. As an example, Simple Object Access Protocol (SOAP) is an example of a protocol that supports transport independent communication between network nodes. SOAP messages may now be exchanged using a variety of transport protocols. There are now protocols for SOAP over HyperText Transport Protocol (HTTP), SOAP over User Datagram Protocol (UDP), SOAP over Transmission Control Protocol (TCP), SOAP over eXtensible Messaging and Presence Protocol (XMMP), SOAP over Java Message Service (JMS), and others. As new transports are desired to serve as an underlying transport for SOAP messages, a SOAP binding is authored that permits SOAP messages to be transported over that transport protocol. Since SOAP messages may be transmitted over any one of several protocols, SOAP messages may be regarded as "transport independent". This is even more so given that the number of transport protocols over which SOAP message may be transported may be extended with addition bindings. Although the arrows 211 and 213 are not marked with an asterisk, the communications represented by arrows 211 and 213 may also be performed using an overarching protocol (e.g., SOAP) that is not limited to any one specific underlying transport.

Conventional redirection is accomplished using the particular transport. For example, HyperText Transport Protocol (HTTP) offers HTTP-based redirection. Other transports might offer no redirection mechanism at all. The principles described herein allow for redirection without requiring that the underlying transport protocol has a redirection mechanism. Furthermore, since the redirection is not limited to a particular transport, the redirection is not limited to message exchange patterns offered by the underlying transport protocol. For instance, HTTP is limited to a request-response message pattern. Accordingly, HTTP redirect is limited to a request-response message exchange. Since the principles described herein permit redirection independent of the underlying transport, redirection is made possible using a wide variety of message exchange patterns.

Figure 3:
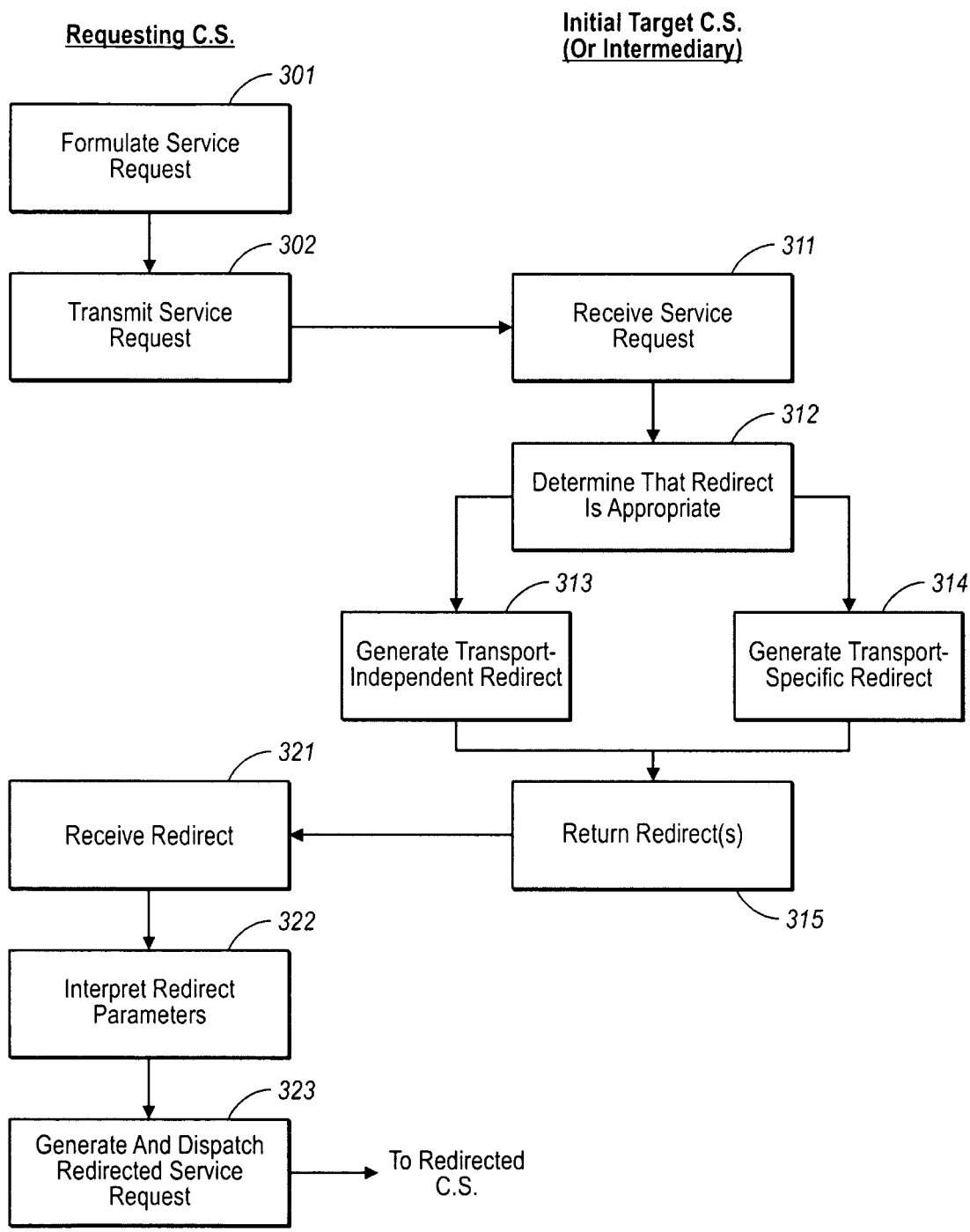
FIG. 3 illustrates a flowchart of a method for performing redirection in a transport-independent manner.

FIG. 3 illustrates a flowchart of a method 300 for redirecting a service request. Some of the acts of the method 300 are performed by the requesting computing system (e.g., requesting computing system 201 of FIG. 2) and are illustrated in the left column of FIG. 3 under the heading "Requesting C.S.". Some of the acts of the method 300 are performed by the initial target computing system (e.g., initial target computing system 202 of FIG. 2) or its intermediary (e.g. intermediary computing system 204 of FIG. 2). Those acts are illustrated in or centered around the right column of FIG. 3 under the heading "Initial Target C.S. (Or Intermediary)".

The requesting computing system formulates a service request (act 301). Referring to FIG. 2, the requesting computing system 201 formulates the service request 221. In one embodiment, the service request might be hierarchically structured such as with an eXtensible Markup Language (XML) structure. As a more specific example, the service request 221 might be a SOAP envelope. The requesting computing system then transmits the service request towards the initial target computing system (act 302). For instance, in FIG. 2, the requesting computing system 201 transmits the service request 221 to the initial target computing system 202 as represented by the arrow 211.

Upon receiving the service request (act 311), the initial target computing system (or its intermediary) determines that the requested service should be satisfied by another service providing computing system (act 312), and if so, generates a redirect message to respond to the service request that includes transport-independent redirection parameters (act 313). In FIG. 2, for example, the initial target computing system 202 (or its intermediary 204) generates the redirect message 222. The redirect response may be an XML structure, and in one embodiment, is a SOAP envelope. The redirect message may also optionally include transport-dependent redirection parameters in case the requesting computing system is not able to handle a transport-independent redirection, but can understand the redirection mechanism of the specific transport that was used to provide the service request.

As pertaining to the transport-independent redirection, a particular example will now be provided with respect to SOAP. As previously mentioned, SOAP envelopes may be transported over any one of multiple possible transports. The redirect message is then provided from the initial target computing system (or its intermediary) to the requesting computing system. In FIG. 2, the initial target computing system 202 (or its intermediary 204) provides the redirect message 222 back to the requesting computing system including at least some of the generated transport-dependent and/or transport-independent redirection parameters (see act 315 in FIG. 3). In one embodiment, to facilitate backwards compatibility, if the initial target computing system (or its intermediary) determines that the underlying transport used to communicate with the requesting protocol has its own transport-level redirection capability, the transport-level redirect parameters may also be included within the redirect message (act 314). If the initial target computing system (or its intermediary) believes that the requesting computing system is not able to handle a transport-independent redirection, some or all of the generated transport-independent redirection parameters may be omitted from the redirect response, leaving only perhaps one or more transport-dependent redirection parameters.

Figure 4A:
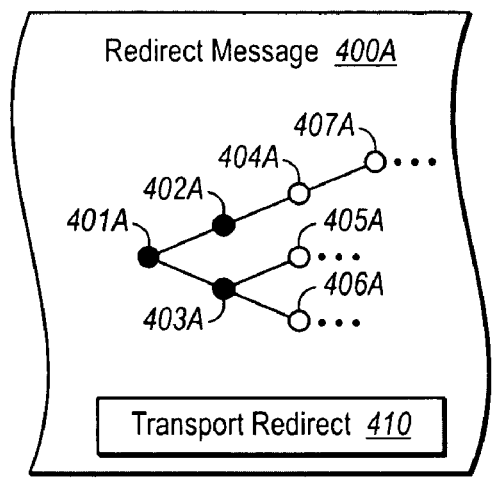
FIGS. 4A through 4C each schematically illustrate a corresponding redirect message in which the redirection parameters are specified hierarchically or non-hierarchically.

FIG. 4A schematically illustrates a data structure 400A of a redirect message 400A. The redirect message 400A includes redirect parameters. In the redirect message 400A, the redirect parameters are structured hierarchically. While any hierarchical structure may suffice, the hierarchical structure includes nodes 401A through 407A. However, the ellipses represent that this structure may be extensible. The following SOAP example shows redirect parameters being represented hierarchically. The example is presented in SOAP version 1.2 format. Line numbering is added for clarity.

```
1.   <s:Envelope xmlns:s="http://www.w3.org/2003/05/soap-envelope">
2.     <s:Header/>
3.     <s:Body>
4.       <s:Fault>
5.         <s:Code>
6.           <s:Value>s:Sender</s:Value>
7.           <s:Subcode>
8.             <s:Value xmlns:a="http://schemas.microsoft.com/ws/2007/03/redirect">a:redirect</s:Value>
9.             <s:Subcode>
10.              <s:Value xmlns:a="http://schemas.microsoft.com/ws/2007/03/redirect">a:other</s:Value>
11.              <s:Subcode>
12.                <s:Value xmlns:d6p1="http://schemas.microsoft.com/ws/2007/03/redirect/other">d6p1:permanent</s:Value>
13.                <s:Subcode>
14.                  <s:Value xmlns:d6p1="http://schemas.microsoft.com/ws/2007/03/redirect/other">d6p1:connection</s:Value>
15.                </s:Subcode>
16.              </s:Subcode>
17.            </s:Subcode>
18.          </s:Subcode>
19.        </s:Code>
20.        <s:Reason>
21.          <s:Text xml:lang="en-US">This service has moved to http://another/address.</s:Text>
22.        </s:Reason>
23.        <s:Detail>
24.          <OtherRedirect xmlns:i="http://www.w3.org/2001/XMLSchema-instance" xmlns="http://schemas.microsoft.com/ws/2007/03/redirect">
25.            <Location>
26.              <Address xmlns="http://www.w3.org/2005/08/addressing">http://another/address</Address>
27.            </Location>
28.          </OtherRedirect>
29.        </s:Detail>
30.      </s:Fault>
31.    </s:Body>
32.  </s:Envelope>
```

Lines 1-32 represent the SOAP envelope example in its entirety. Line 2 represents the Header element which, in this example, is empty. Lines 3-31 represent the Body element of the SOAP envelope. The Body element includes a single child element, a Fault element spanning lines 4-30. The Fault element may be used in SOAP version 1.2 to express that the correlated service request was not handled. In this embodiment, the Fault element will be used to include the redirect information.

In SOAP 1.2, the Fault element, if present, includes a mandatory Code element. In this example, the Code element spans lines 5-19. In SOAP 1.2, the Code element includes a mandatory child Value element. The Value element is fully contained in line 6, and includes a XML Qualified Name (or "QName") called "Sender", indicating that there is something that the sender did to cause the fault. In this case, the sender did not specify the address of the service that will handle the request.

Figure 5:
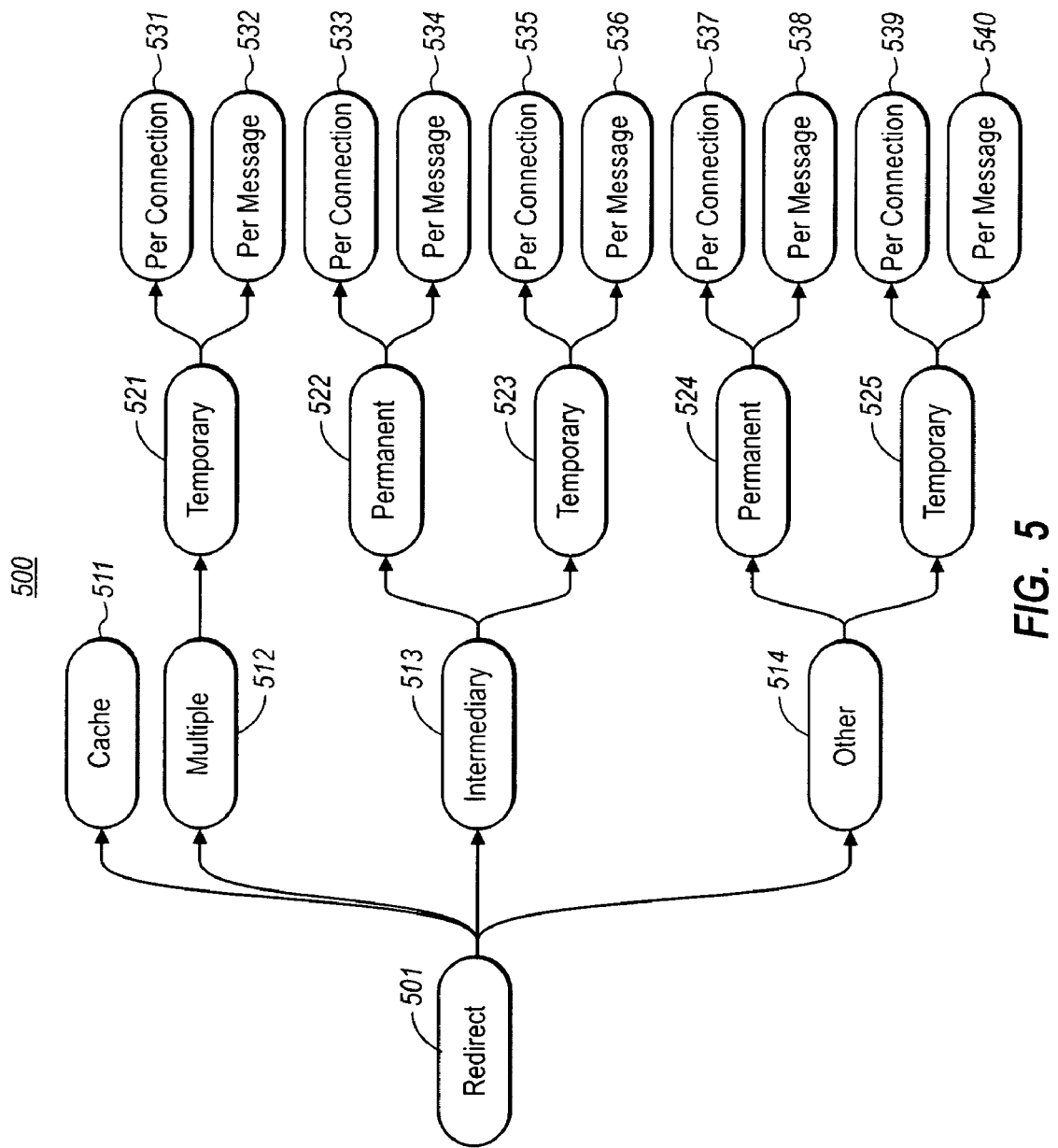
FIG. 5 illustrates an example hierarchical structure of redirect parameters.

The Code element includes an optional Subcode element in this case spanning lines 7-18. This Subcode element represents a parent node in a hierarchical structure of redirect information. FIG. 5 illustrates an example hierarchical structure 500 of redirect information that includes all branches, although any given redirect message might include but a single branch of that hierarchical structure. The Subcode element spanning lines 7-18 includes a Value child element at line 8 that includes the value "redirect". This indicates that the message is a redirect message, and corresponds to the root node 501 in the hierarchical tree of FIG. 5.

The Subcode element spanning lines 7-18 (representing the root node 501) itself includes a Subcode element spanning lines 9-17. Through this Subcode element nesting, the hierarchical structure may be constructed in this example. The Subcode element spanning lines 9-17 includes a Value element at line 10 specifying the value "other". Thus, referring to FIG. 5, the Subcode element spanning lines 9-17 may correspond to the child node 514 of FIG. 5. Node 511 might be used if, for example, the requesting computing system is to be redirected to its own cache for the requested resource or service. Node 512 might be used if, for example, there are multiple possible redirect addresses that the requesting computing system should choose from. Node 513 might be used if, for example, the requesting computing system is being redirected through a proxy.

The Subcode element spanning lines 9-17 (corresponding to node 514 in FIG. 5), also includes a child Subcode element spanning lines 11-16, which has a Value child element at line 12 that specifies a value "permanent". This means that the redirection is permanent, which means that the requesting computing system should always in the future use the redirected address to request the service. Accordingly, the Subcode element spanning lines 11-16 corresponds to the node 524 in the hierarchical tree.

A "temporary" value at line 12 would mean that the redirection is only temporary. A permanent redirection might cause the requesting computing system to change a durable address book that stores the request location, whereas a temporary redirection would not. Nodes 521 through 523 represent that some other types of redirection include temporary and/or permanent types of redirection. For instance, the multiple redirection type (node 512) is always of a temporary nature (node 521). The intermediary redirection type (node 513) may include permanent (node 522) or temporary (node 523) types. The other redirection type (node 513) also includes permanent (node 524) and temporary (node 525) types.

The Subcode element spanning lines 11-16 (corresponding to node 524 in FIG. 5), also includes a child Subcode element spanning lines 13-15, which has a Value child element at line 14 that specifies a value "connection". This means that the redirection is to last through the duration of the connection, rather than being associated for just the message itself. This allows for redirection under multiple message exchange patterns to be unambiguously treated. For example, in a message pattern in which the requesting computing system is to send a correlated set of messages to the target computing system, a "connection" value would mean that all of the messages are to be sent to the redirected address. A "message" value would mean that just the current message is to be redirected to the redirected address, but subsequent messages in the session may be directed towards the initial target computing system. The value of "connection" at line 14 corresponds to the node 539 in FIG. 5. Note that each of nodes 521 through 525 have corresponding "connection" and "message" type redirections represented by nodes 531 through 540.

A Reason element is a mandatory child element of the Fault element in SOAP 1.2 and expresses a human-readable reason for the fault in a Text child element. In the above example, the Reason element spans lines 20-22 and includes the Text child element at line 21.

A Detail element is an optional child element of the Fault element in SOAP 1.2. In this example, the Detail element spans lines 23-29. The Detail element may include a complex type that depends on the type of redirection. For instance, the complex type may be different depending on whether the redirection is a cache redirection (node 511 in FIG. 5), a multiple redirection (node 512 in FIG. 5), an intermediary redirection (node 513 in FIG. 5), or an other redirection (node 514 in FIG. 5). The OtherRedirect element is an example of a suitable complex type for a redirection of type "other". The OtherRedirect element is a child element of the Detail element and spans lines 24-28.

The complex type of OtherRedirect includes a child element called Location, that spans lines 25-27, which includes an address child element at line 26. The address child element specifies the address of the redirection target computing system. For instance, in the example of FIG. 2, the address specified in line 26 may be the address of the redirection target computing system 203.

When the requesting computing system receives such a structure, the requesting computing system may have a concept of the entire hierarchical structure 500 of FIG. 5. However, perhaps the requesting computing system only has an earlier version of the hierarchical structure 500, and understands only nodes 501, and 511 through 514. The requesting computing system may (assuming that understanding of the nodes 521-525 and 531-540 are not mandatory for understanding) simply perform processing based on the node 511 through 514 specified in the redirection message. Thus, the hierarchical tree 500 may be expanded and further built upon, while being compatible with earlier redirection implementations.

Referring to FIG. 4A, to facilitate further backward compatibility, the redirect message 400A may include a transport dependent redirection instruction 410. For instance, the transport-dependent redirection instruction 410 might specify a HTTP redirect code in the 300's. Other redirect message examples 400B and 400C are also shown with such a transport dependent redirection instruction 410. The requesting computing system might use the transport-dependent redirection instruction 410 if the requesting computing system is not capable of understanding the transport-independent redirect instruction. Thus, the requesting computing system may depend on conventional HTTP redirection if it is not capable of transport-independent redirection.

Referring to FIG. 4A, note that some of the nodes are solid, whereas others are hollow. For example, nodes 401A, 402A and 403A are each illustrated as solid, and nodes 404A through 407A are illustrated as hollow. This is done to present the principle that some of the nodes may be required to understand in order to properly process the transport-independent redirection. For instance, in interpreting the redirection message, suppose the requesting computing system interprets and understands node 401A, but does not understand node 402A presented in the redirection message. This might cause the redirection to fail. In that case, the transport-dependent redirection 410 might be relied upon instead. On the other hand, suppose that the requesting computing system interpreted and understood node 402A presented in the redirection message, but did not understand node 404A presented in the redirection message. In that case, since node 404A is optional, the transport-independent redirection might be used.

Figure 4B:
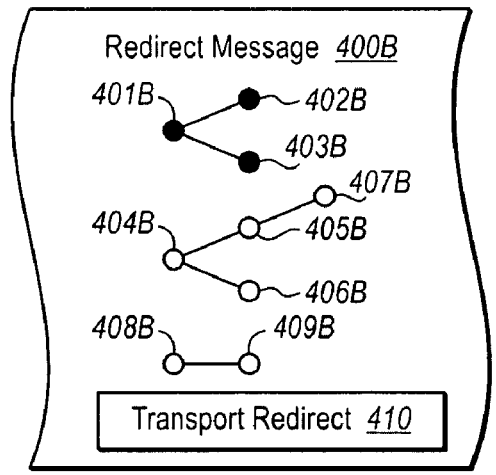

FIG. 4B illustrates an alternative data structure 400B that shows a different way or representing the redirection parameters. In this example, the redirection parameters are separated into different hierarchical trees. For instance, nodes 401B through 403B are in one hierarchy, nodes 404B through node 407B are in another, and nodes 408B and 409B are in yet another. There might be any number of ways to divide which redirection parameters are in which tree. One might be a subject matter division, another might divide by which nodes are mandatory and which are not, and so forth.

Figure 4C:
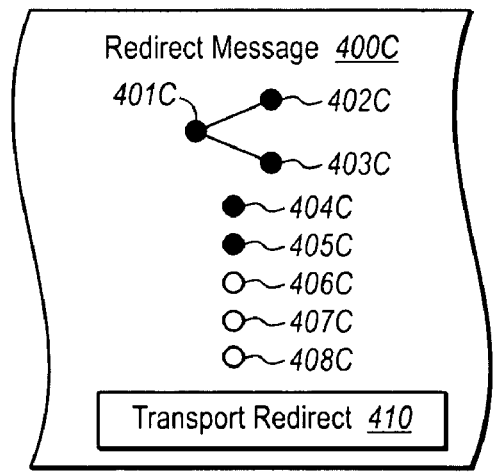

FIG. 4C illustrates yet another example data structure 400C in which redirection parameters may be presented. In this embodiment, there are only a few nodes that are hierarchically structured including nodes 401C through 403C. The others are represented in a flat manner, perhaps as being the children elements of the same parent element. The flat nodes include nodes 404C through 408C. In one embodiment, the hierarchically structured nodes 401C through 403C might include the nodes 501, and 511 through 514 of the hierarchical structure 500, and the remaining nodes 521 through 525 and 531 through 540 are included in some other portion of the redirect message. As one example, the other nodes might be presented in the header portion of the SOAP envelope. Using SOAP 1.2, this would give the initial target computing system the option of specifying that the element was a "must understand" element. For instance, in FIG. 4C, nodes 404C and node 405C may be specified in the header as "must understand", whereas nodes 406C through 408C have no such "must understand" attribute.

On the other hand, the other nodes 404C through 408C might be included within the body of the SOAP envelope. One possible location is the optional Details element that is a child element of the Fault element. The following example SOAP 1.2 envelope is an example of this. Line numbering is added for clarity.

```
1.   <s:Envelope xmlns:s="http://www.w3.org/2003/05/soap-envelope">
2.     <s:Header />
3.     <s:Body>
4.       <s:Fault>
5.         <s:Code>
6.           <s:Value>s:Sender</s:Value>
7.           <s:Subcode>
8.             <s:Value xmlns:a="http://schemas.microsoft.com/ws/2007/03/redirect">a:redirect</s:Value>
9.             <s:Subcode>
10.              <s:Value xmlns:a="http://schemas.microsoft.com/ws/2007/03/redirect">a:other</s:Value>
11.            </s:Subcode>
12.          </s:Subcode>
13.        </s:Code>
14.        <s:Reason>
15.          <s:Text xml:lang="en-US">This service has moved to http://another/address.</s:Text>
16.        </s:Reason>
17.        <s:Detail>
18.          <OtherRedirect xmlns:i="http://www.w3.org/2001/XMLSchema-instance" xmlns="http://schemas.microsoft.com/ws/2007/03/redirect">
19.            <Location>
20.              <Address xmlns="http://www.w3.org/2005/08/addressing">http://another/address</Address>
21.            </Location>
22.            <q:Duration xmlns:d6p1="http://schemas.microsoft.com/ws/2007/03/redirect/other" xmlns:q="http://schemas.microsoft.com/ws/2007/03/redirect">d6p1:permanent</q:Duration>
23.            <q:Scope xmlns:d6p1="http://schemas.microsoft.com/ws/2007/03/redirect/other" xmlns:q="http://schemas.microsoft.com/ws/2007/03/redirect">d6p1:connection</q:Scope>
24.          </OtherRedirect>
25.        </s:Detail>
26.      </s:Fault>
27.    </s:Body>
28.  </s:Envelope>
```

This structure is similar to that of the previous example with a notable exception. Namely, the complex type of the Details element is now where the scope ("Connection" versus "Message") and duration ("Permanent" versus "Temporary") are specified. Line 22 represents a Scope child element of the Details element, which specifies that the redirection is for the entire connection. Line 23 represents a Duration child element of the Details element, which specifies that the redirection is permanent.

The use of a transport-independent mechanism to perform redirection means that the redirection may be accomplished using any one of a number of different transport protocols. For instance, the redirection might be accomplished using an asynchronous transport protocol, examples of which include JMS and Simple Mail Transport Protocol (SMTP), and the like. The redirection may also be accomplished via a fully duplex transport protocol such as, for example, Transmission Control Protocol (TCP). The transport protocol might also be half-duplex such as, for example, HTTP. The redirection does not dependent on any specific type of transport protocol, and may even use transport protocols that do not themselves have any form of redirection mechanism. This facilitates a variety of possible message exchanges.

Furthermore, the redirection process is transport-independent for each of the three communication steps of 1) the requesting computing system 201 submitting the service request 221 to the initial target computing system 202, 2) the initial target computing system 202 providing a redirect message 222 back to the requesting computing system 201, and 3) the requesting computing system 201 providing a redirected service request 223 to the redirection target computing system 203. Accordingly, these communications may, but need not, be accomplished using the same transport protocol. For instance, the service message 221 and the redirected service request might be accomplished using User Datagram Protocol (UDP), whereas the redirection message may have been dispatched in an e-mail using SMTP. Considering that different protocols may be used in these various communications, a limitless amount of message exchanges are possible in a redirection environment.

Figure 6:
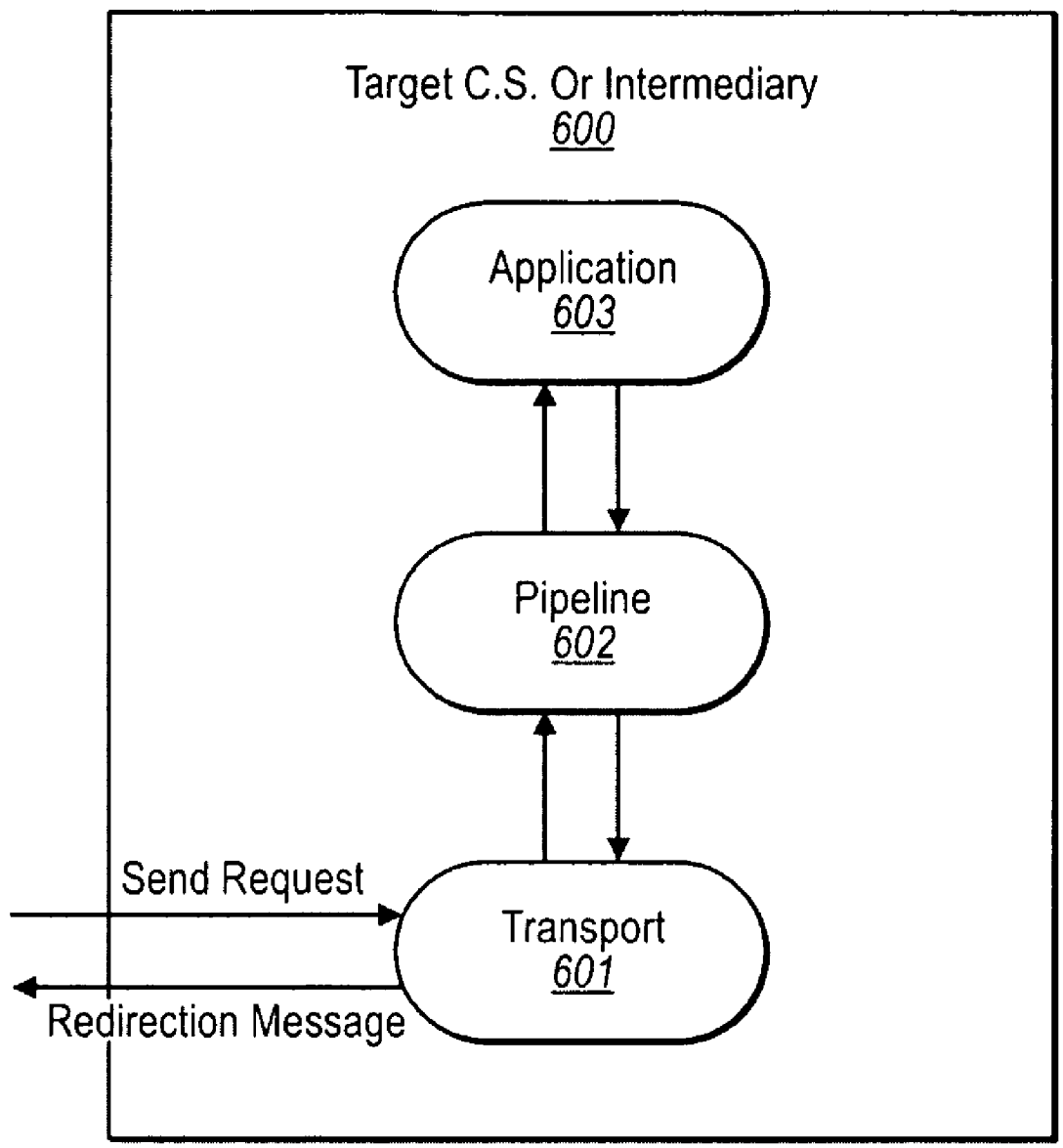
FIG. 6 schematically illustrates an example architecture of message handling within a server.

FIG. 6, shows initial target computing system (or intermediary) 600 includes a transport 601, a pipeline 602 and an application 603. Incoming service request message are typically processed at the transport level 601, before being provided to an intermediate component (e.g., pipeline 602), if any, prior to being provided to the application 603. Any one of these components 601 through 603 may determine, however, that the redirection is appropriate and generate the redirection message. In one embodiment, the redirection is even accomplished at the requesting computing system, perhaps at a lower level of the communication stack than where the service request was generated.

Referring to FIG. 3, the requesting computing system receives the redirect message corresponding to the initial request (act 321). For instance, in FIG. 2, the requesting computing system 201 may receive the redirect message 222. The redirect message identifies the address of the redirection target computing system 203 to which the service request is to be redirected. For instance, in both of the above two SOAP examples, the redirection address is specified in the following element:

```
<Address
  xmlns="http://www.w3.org/2005/08/addressing">http://another/
  address</Address>
```

The requesting computing system then interprets the redirection parameters included in the redirect message (act 322). Then, the requesting computing system responds to such parameters by redirecting the service request towards the second target computing system (act 323). As previously mentioned, if the redirection parameters are formulated as a hierarchical structure of redirection parameters, the interpretation of such parameters might involve navigating the hierarchical structure as far as can be understood, and ignoring any optional parts of that hierarchical structure that cannot be understood. This permits the hierarchical structure to be extended without losing compatibility with older hierarchical structures.

A redirect mechanism has thus been described which allows for redirection without regard for the underlying transport protocol, even if that underlying transport protocol does not support its own redirection mechanism. This enables redirection to be accomplished in a wide-variety of message exchanges.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more computer-readable storage device having stored thereon computer-executable instructions that, when executed by one or more processors of a computing system, causes the computing system to perform a method for a redirection computing entity to redirect a service request message in a transport independent manner, the method comprising:
   in response to the redirection computing entity receiving a service request from a requesting computing system for a service to be provided by an initial service providing computing system, an act of the redirection computing entity determining the requested service should be satisfied by another service providing computing system;
   in response to the act of determining, an act of the redirection computing entity generating redirection parameters in response to the service request, with at least some of the redirection parameters being optional redirection parameters, the redirection parameters also including at least some redirection parameters that are independent of a transport protocol used to return the redirect message to the requesting computing system, and wherein the redirection parameters include a value that specifies either that the redirection is to last through the duration of a connection or, alternatively, only for a duration of a particular message; and
   an act of providing at least some of the redirection parameters as a redirect message to the requesting computing system.

2. A computer program product in accordance with claim 1, wherein the redirect message specifies parameters for a redirect hierarchically.

3. A computer program product in accordance with claim 1, wherein the redirect message is structured as an eXtensible Markup Language (XML) structure.

4. A computer program product in accordance with claim 1, wherein the act of providing the redirect message to the requesting computing system is performed using an asynchronous transport protocol.

5. A computer program product in accordance with claim 1, wherein the act of providing the redirect message to the requested computing system is performed using a duplex transport protocol.

6. A computer program product in accordance with claim 1, the method further comprising:
an act of the redirecting computing entity also generating transport-dependent redirection parameters.

7. A computer program product in accordance with claim 1, wherein the redirection computing entity is a component of the requesting computing system.

8. A computer program product in accordance with claim 1, wherein the redirection computing entity is an intermediate computing entity between the requesting computing system and the initial service providing computing system.

9. A computer program product in accordance with claim 1, wherein the redirection computing entity is a component of the initial service providing computing system.

10. A computer program product in accordance with claim 9, wherein the redirection computing entity is an application component of the initial service providing computing system.

11. A computer program product in accordance with claim 9, wherein the redirection computing entity is a transport of the initial service providing computing system.

12. A computer program product in accordance with claim 1, wherein a transport used for the redirection computing entity to receive the service request is different than a transport used in the act of providing the redirect message to the requesting computing system.

13. A computer program product in accordance with claim 1, wherein the one or more computer-readable storage device comprises system memory.

14. A computer-implemented method for a requesting computing system to experience a redirect to a second service providing computing system when requesting a service from a first service providing computing system, the method comprising:
an act of formulating a service request;
an act of transmitting the service request towards the first service providing computing system;
an act of receiving a redirect message corresponding to the service request, the redirect message identifying the second service providing computing system as a target of the redirect, wherein the redirect message is received in a structure that is independent of the underlying transport used to receive the message;
an act of interpreting redirection parameters included in the redirect message, wherein the act of interpreting redirection parameters includes:
an act of navigating at least part of a hierarchical structure of redirection parameters by interpreting each redirection parameter included in each node navigated to; and
an act of abstaining from interpreting one or more branches of the hierarchical structure; and
an act of the requesting computing system redirecting the service request towards the second service providing computing system.

15. A method in accordance with claim 14, wherein at least one of the redirection parameters are mandatory parameters that, if not understood, result in a failure to redirect using the redirection parameters.

16. A method in accordance with claim 14, wherein the act of transmitting the service request towards the first service providing computing system, an act of receiving a redirect message corresponding to the service request, are all performed using the same transport-independent protocol.

17. A method in accordance with claim 14, wherein the redirect message includes transport-independent redirection parameters and at least one transport-dependent redirection parameter.

18. A method in accordance with claim 17, wherein the act of the requesting computing system redirecting the service request towards the second service providing computing system is accomplished using the at least one transport-dependent redirection parameter.

19. A compute-implemented method for a service providing computing system to redirect a service request from a requesting computing system using an overarching protocol that operates over any one or multiple possible transport protocols, the method comprising:
an act of receiving a service request from the requesting computing system using the overarching protocol;
an act of determining that the requested service should be satisfied by another service providing computing system;
in response to the act of determining, an act of generating a redirect message in response to the service request, the redirect message including a plurality of redirection parameters, only some of which are mandatory in order to process the redirect message at the requesting computing system, and wherein the redirection parameters include a value that specifies either that the redirection is to last through the duration of a connection or, alternatively, only for a duration of a particular message; and
an act of providing the redirect message to the requesting computing system using the overarching protocol.

20. The method recited in claim 14, wherein the redirection parameters are included in a body section of the redirect message, following a header portion of the redirect message.

21. The method recited in claim 14, wherein the redirection parameters include a value that specifies whether the redirection is a temporary redirection or a permanent redirection, wherein a permanent redirection causes a bookmark at the requesting computing system to be changed.

22. The method of claim 19, wherein the redirect message is provided to the requesting computing system as a hierarchical structure of redirection parameters and wherein the requesting computing system abstains from interpreting at least one branch of the hierarchical structure in response to receiving the redirect message.

23. The method of claim 19, wherein the value consists of either "connection" or, alternatively, "message", and which specifies whether the redirection is to last through the duration of a connection or, alternatively, only for a duration of a particular message, respectively.

* * * * *